United States Patent
Brewer et al.

(10) Patent No.: US 8,272,663 B2
(45) Date of Patent: Sep. 25, 2012

(54) TOW ASSEMBLY FOR HEAVY TRUCKS

(75) Inventors: Robert Renie Brewer, High Point, NC (US); Arthur Nalson Fowler, Winston-Salem, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 270 days.

(21) Appl. No.: 12/919,115

(22) PCT Filed: Feb. 29, 2008

(86) PCT No.: PCT/US2008/002749
§ 371 (c)(1),
(2), (4) Date: Aug. 24, 2010

(87) PCT Pub. No.: WO2009/108155
PCT Pub. Date: Sep. 3, 2009

(65) Prior Publication Data
US 2011/0001303 A1  Jan. 6, 2011

(51) Int. Cl.
*B60D 1/14* (2006.01)
(52) U.S. Cl. ........................ 280/495; 280/515
(58) Field of Classification Search .................. 280/495, 280/515
See application file for complete search history.

(56) References Cited

U.S. PATENT DOCUMENTS

| | | | |
|---|---|---|---|
| 2,452,785 A * | 11/1948 | Olney | 280/495 |
| 4,023,823 A | 5/1977 | Saunders | |
| 4,057,265 A | 11/1977 | Grace | |
| 4,354,692 A * | 10/1982 | Shoup | 280/495 |
| 5,143,393 A | 9/1992 | Meyer | |
| 6,357,780 B1 * | 3/2002 | Young | 280/506 |
| 6,402,179 B1 | 6/2002 | Morris | |
| 6,957,825 B2 | 10/2005 | Peters | |
| 7,021,646 B1 | 4/2006 | Cheng | |
| 7,441,793 B1 * | 10/2008 | Lim | 280/504 |

FOREIGN PATENT DOCUMENTS

GB 0 460 168 A1 1/1937

* cited by examiner

*Primary Examiner* — Kevin Hurley
(74) *Attorney, Agent, or Firm* — Martin Farrell; Michael Pruden

(57) ABSTRACT

A tow assembly for a truck for high capacity loads provides independent load paths interconnected to a tow eye for bearing a towing load. According to one embodiment, the assembly includes a mounting interface having a front face and oppositely located side faces and defining an interior space, a first outer member extending from one side face of the mounting box, a second outer member extending from an opposite side face of the mounting box, an inner member disposed and extending through the first outer member, the interface, and the second outer member, and, a tow eye mounted to the front face of the interface and structurally interconnected to the inner bar. Towing loads are transmitted to the mounting interface and distributed and shared by the inner member and first and second tube structure.

13 Claims, 4 Drawing Sheets

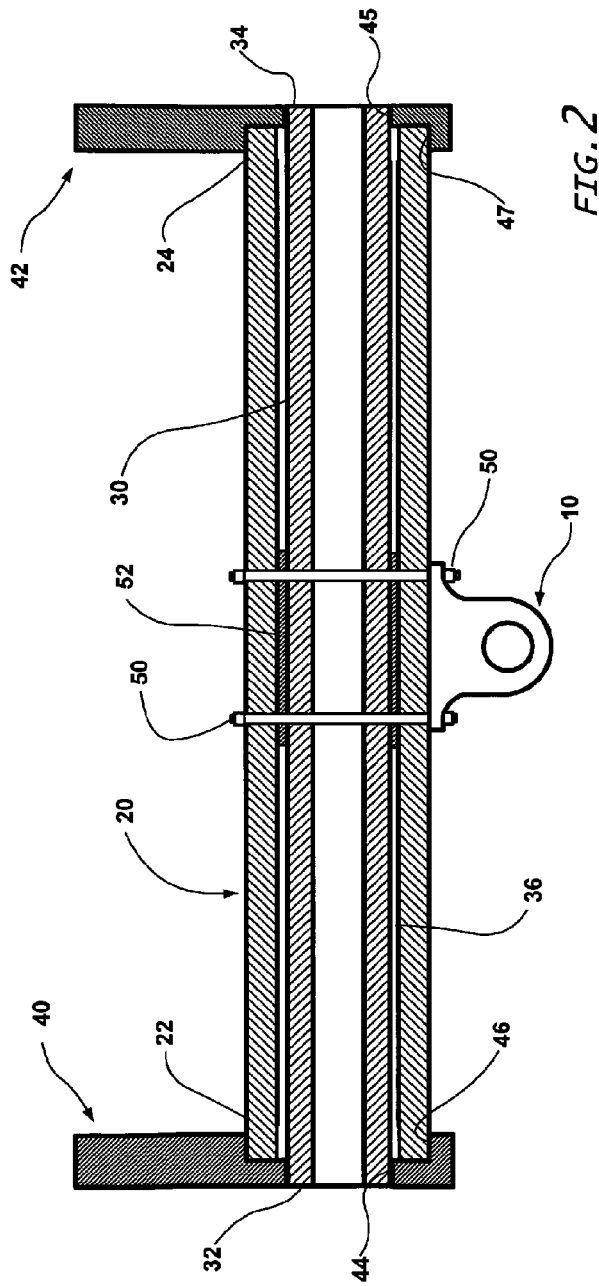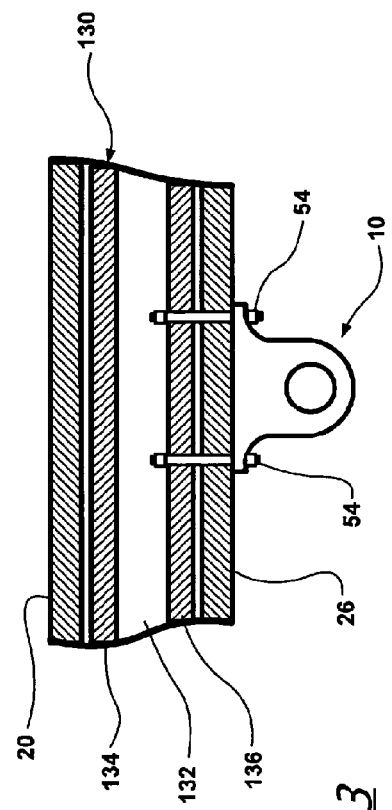

TOW ASSEMBLY FOR HEAVY TRUCKS

FIELD OF THE INVENTION

The invention relates to tow assemblies for heavy truck chassis structures, and more specifically, to a tow assembly for a heavy truck that can be mounted to a truck frame.

BACKGROUND AND SUMMARY OF THE INVENTION

A truck may need at times to be towed, that is, lifted at and/or pulled from its front or rear end. Such occasions may occur during manufacture and delivery, during service in vocational applications, and at times when the truck becomes disabled for one reason or another. It is convenient to use a center tow attachment at the front of the truck, that is, a towing attachment located at or about a center of the truck's bumper.

With heavy trucks there is a need for the tow attachment to have a high load capacity.

It is desirable that the tow attachment assembly have a redundancy in the event of the failure of a component part.

The invention provides a tow attachment assembly for a heavy truck that fulfils these needs.

A tow assembly according to the invention includes an arrangement of two load bearing paths, configured as an inner load bearing member and an outer load bearing member, with a tow eye and an interface interconnecting the tow eye to both the inner member and the outer member in such a manner as to effectively split a load applied to the tow eye between the load bearing members. Preferably, the interface interconnects the tow eye, outer member, and inner member so that the load is divided approximately equally between the inner load bearing member and outer load bearing member.

According to one embodiment, a tow assembly includes an outer hollow member and an inner member disposed in the outer member, ends of the outer member and inner member being substantially coextensive, and a tow eye mounted on the outer member with an interface structurally interconnecting the tow eye to both the outer member and inner member.

An interface in accordance with the invention may include bolts that engage and fasten the tow eye, outer member, and inner member, the bolts extending through appropriately located holes in the outer member, inner member and tow eye. Nuts or other devices may be used to secure the assembly together at the interface location.

According to one embodiment, the outer member and inner member are tubular members, the inner member having an outer dimension less than an inner dimension of the outer member. The tubular members may be cylindrical tubular members or square or rectangular tubular members. To allow the load to be divided between the inner member and outer member, the inner member outer dimension is selected to allow relative movement between the inner member and outer member away from the interface location. The relative movement may be sliding movement if the relative dimensions are selected so that the members are in contact.

According to an alternative aspect, the inner member may be sized to provide a gap between the outer surface of the inner member and the inner surface of the outer member. The interface may include a short sleeve may be positioned between the outer surface of the inner member and the inner surface of the outer member at a location for mounting the tow eye. An interface sleeve is dimensioned to contact both the inner member and outer member to provide an interconnection between the inner member and outer member at a point where the tow eye is fastened.

According to another embodiment, the outer member may be formed as a square or rectangular tube and the inner member may be formed as an I-beam. The tow eye may be fastened to an outer face of the outer member and a flange of the I-beam.

According to another embodiment of the invention, an interface comprises a box-like structure having a front face, a rear face and oppositely located side faces and defining an interior space. An outer member includes a first tubular member attached to and extending from one side face of the interface, and a second tubular member attached to and extending from an opposite side face of the interface. An inner member is disposed in and extends through the first outer member, the side faces of the interface, which are provided with holes for this purpose, and the second outer member, the inner member being attached to the side faces of the interface. A tow eye is mounted to the front face of the mounting box and the interface further includes fasteners to structurally interconnect the tow eye, the inner member and the front face. Because the inner member and outer member are both attached to the side faces of the interface, load transmitted from the front face to the side faces is accordingly transmitted to the inner member and outer member. The inner member and outer member may conveniently be tubular in shape, but other shapes may be used.

According to another aspect of the invention, with a tubular inner member it is convenient to provide interface fasteners as U-shaped bolts engaging the inner member and having free ends extending through holes in the front face and holes in the tow eye, with nuts securing the bolts to the tow eye.

A tow eye as used here means a device to which a tow hook or cable can be attached. According to one embodiment, a tow eye includes a base plate, spaced upper and lower flanges extending from the mounting plate and mutually perpendicular, the upper and lower flanges having aligned apertures for a tow pin. The tow eye may also be configured as a mounting plate with an eye hook or other linking device mounted thereon.

According to the invention, the assembly is provided with brackets for mounting to a vehicle frame. The inner member and outer member are elongated members having opposite ends substantially co-extensive. A first mounting bracket is connected to a first end of the outer member and a first end of the inner member, and a second mounting bracket is connected to a second end of the outer member and a second end of the inner member.

According to an embodiment of the invention, the interface is disposed at about a center of the assembly. The interface may alternatively be located at any point or points along the member as is deemed appropriate for the intended use.

Alternatively, the invention may be adapted for use as a dual tow point assembly, by providing a second interface and a second tow eye. The first interface and first tow eye and second interface and second tow eye are mutually spaced, preferably from a center of the tow assembly.

The invention will become better understood by reference to the following detailed description read in conjunction with the appended drawings.

BRIEF DESCRIPTION OF THE DRAWINGS

FIG. 2 is a top section view of the tow assembly of FIG. 1;

FIG. 3 is a section view of an alternative to the embodiment of FIG. 1;

DETAILED DESCRIPTION

A tow assembly of the invention is mountable to a heavy truck frame in a substantially horizontal disposition to provide a connecting point for a towing mechanism, a tow hook, for example. The assembly may be mounted directly or indirectly to the frame rails, in the area of the front bumper or the rear of the truck frame. The tow assembly of the invention provides for increased load capacity when compared to conventional assemblies, along with a redundancy feature, as will be described. The description will use directional terms, such as left, right, top, and bottom, in reference to and as an aid to understanding the drawings; however, such use is not intended to be limiting.

Figure 1:
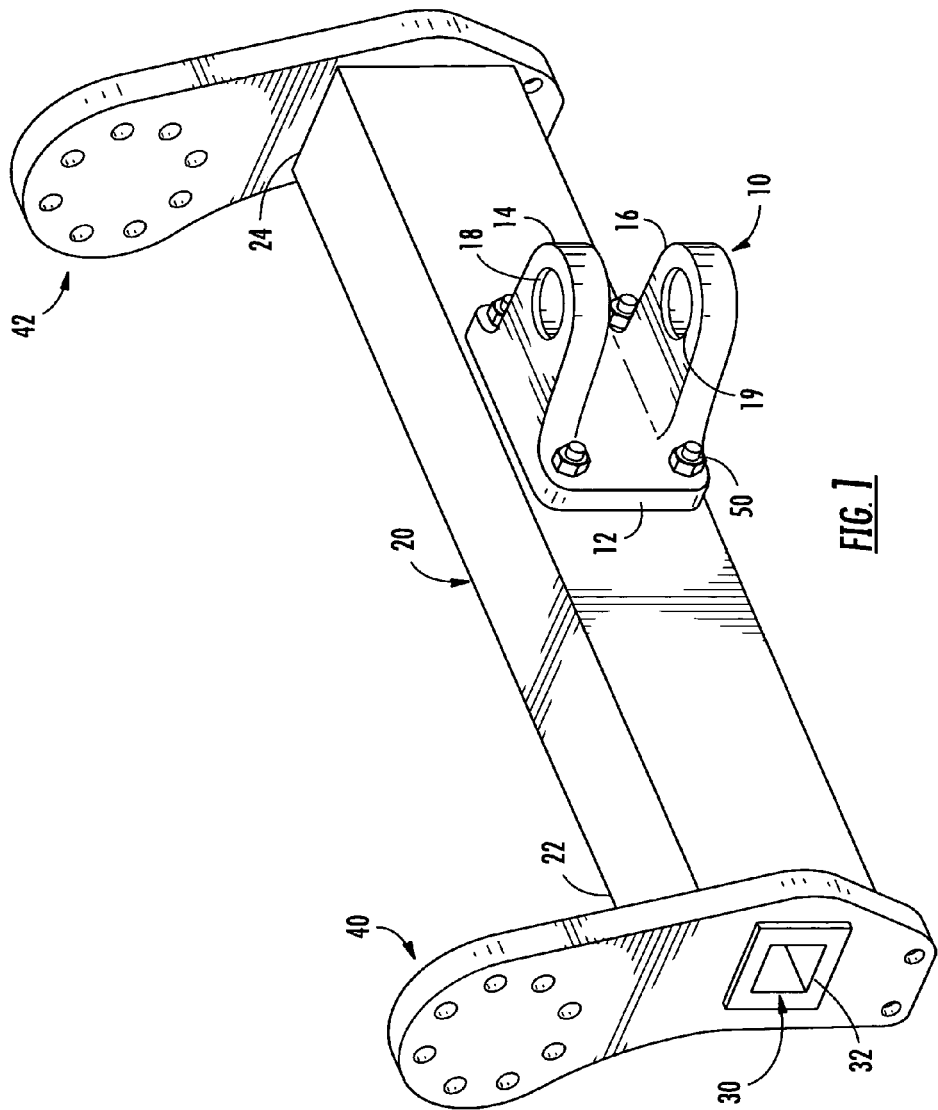
FIG. 1 is a perspective view of a tow assembly in accordance with an embodiment of the invention.

A perspective view of one embodiment of the invention is shown in FIG. 1 and FIG. 2 illustrates a top sectional view of the embodiment of FIG. 1. The assembly includes a tow eye 10 providing a connecting point for a tow hook or other device, an elongated outer member 20, and an elongated inner member 30 disposed in the outer member. A first bracket 40 supports the inner member 30 and outer member 20 at respective first ends 32, 22 and a second bracket 42 supports the inner member 30 and the outer member 20 at respective second ends 34, 24.

The tow eye 10 is mounted in the illustrated embodiment at approximately a center of the assembly. The tow eye 10 is formed with a base 12 and has an upper flange 14 and lower flange 16 extending substantially perpendicularly from the base and mutually spaced. Each flange 14, 16 includes a through hole 18, 19. The holes 18, 19 are mutually concentrically aligned to accept a tow pin (not shown). As is known, a tow pin is provided in the type of tow eye 10 shown in FIG. 1 for connecting to a tow hook or other linking device. Other tow eyes could be used in the assembly of the invention, and the description of the tow eye 10 is provided for purposes of illustration.

According to a feature of the invention, the tow eye 10 is structurally interconnected to both the outer member 30 and the inner member 20 so that a load applied to the tow eye is transmitted in part to the outer member and in part to the inner member. Preferably, the load is substantially equally shared by the outer member 30 and the inner member 20. An interface which includes bolts 50 extending through holes provided in the outer member 20, the inner member 30, and tow eye 10 structurally interconnects these components.

The inner member 30 has an outside dimension that is less than an inner dimension of the outer member 20, which provides a gap 36 therebetween, as illustrated in the embodiment of FIG. 1 and FIG. 2. It is desirable that the inner member 30 and the outer member 20 be capable of relative movement in the portions away from where the tow eye 10 is interconnected to the members to provide separate load paths to the brackets 40, 42. The inner member 30 and outer member 20 may be in contact as long as relative movement, for example, sliding, is possible.

Where a gap 36 is provided, as in FIG. 2, the interface may include a sleeve 52 disposed between the inner member 30 and the outer member 20 to help transmit of load between the inner member and outer member.

The outer member 20 and the inner member 30 are illustrated as rectangular cross section tubes in FIG. 1 and FIG. 2. Alternatively, the outer member and inner member may be cylindrical tubes. The base 12 of the tow eye 10 (referring to FIG. 1) will be shaped to conform to a cylindrical outer surface of such an outer member, or alternatively, the interface may include a mounting plate shaped to provide conformation.

Returning to FIG. 2, the brackets 40, 42 are formed as plates each having a bore hole 44, 45 to receive a mating end of the inner member 30 and a countersunk hole 46, 47 coaxial with the bore hole to accept an end of the outer member 20. The inner member 30 and outer member 20 may be conveniently welded to the brackets 40, 42.

According to another alternative of the invention, illustrated in FIG. 3, the outer member 20 may be a rectangular tube and the inner member 130 may be formed as an I-beam. The inner member 130 has a web 132 and flanges 134, 136 at opposite ends of the web. The tow eye 10 is interconnected to a face 26 of the outer member 20 and to a flange 136 of the inner member 130 by interfacing fasteners 54. Access holes may be provided in the outer member to allow the fasteners 54 to be assembled. A spacer (not illustrated) may be provided between the face 26 of the outer member 20 and the flange 136 of the inner member 130, similar to the sleeve shown in FIG. 2.

Figure 4:
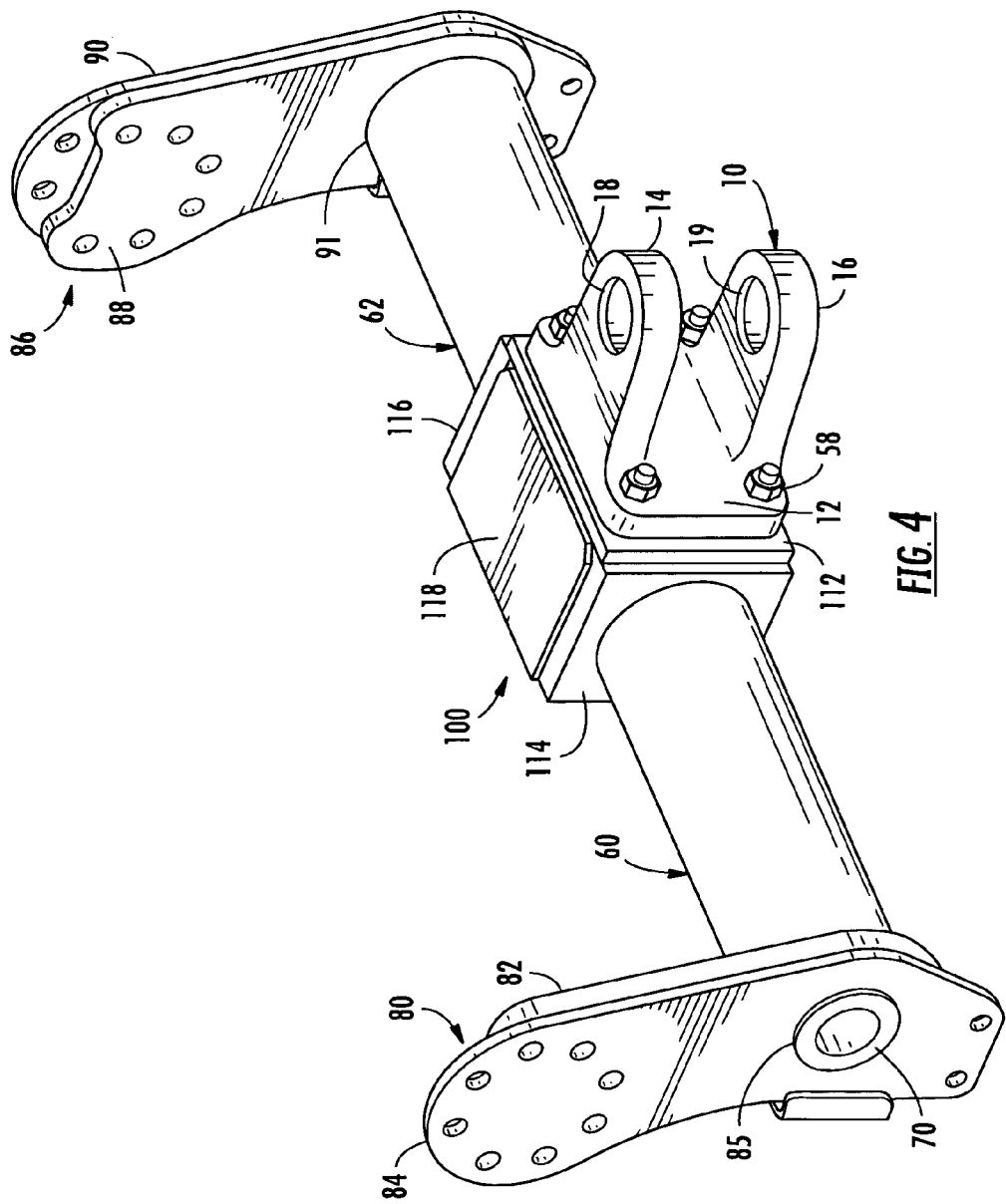
FIG. 4 is a perspective view of an alternative embodiment of the invention.

A perspective view of an alternative embodiment of the tow assembly of the invention is shown in FIG. 4. The tow assembly of this embodiment includes an outer member made up of a first outer member part 60 and a second outer member part 62, and an inner member 70, which is a single elongated member, the end of which may be seen in FIG. 4, disposed in the first outer member and second outer member. The outer member (60, 62) and inner member 70 are shown as cylindrical tubes or pipes, but may have another shape that can be formed with a hollow interior and resist bending forces, such as the square tubular members of the embodiment of FIG. 1.

The first outer member part 60, second outer member part 62, and the inner member 70 are supported at opposite ends by first bracket 80, made up of inward plate 82 and outward plate 84 which are attached by welding or other suitable method, and second bracket 86, similarly made up of an inward plate 88 and an outward plate 90, also attached by welding or another suitable method. The first bracket 80 and second bracket 86 provide an alternative to the brackets 40, 42 shown in the embodiment of FIG. 1, and either bracket embodiment, appropriately modified for the shape of the inner member and outer member, may be used with the embodiments of the invention. The outward plates 84, 90 of the respective brackets include through bores (a through bore 85 is seen in outward plate 84, the bore in outward plate 90 is not visible in FIG. 4) to receive and support the inner member 70. The inward plates 82, 88 include bores (bore 91 in FIG. 4) to receive and support the respective outer member. FIG. 4 shows the bore 91 in inward plate 88 supporting the second outer member 62.

Figure 5:
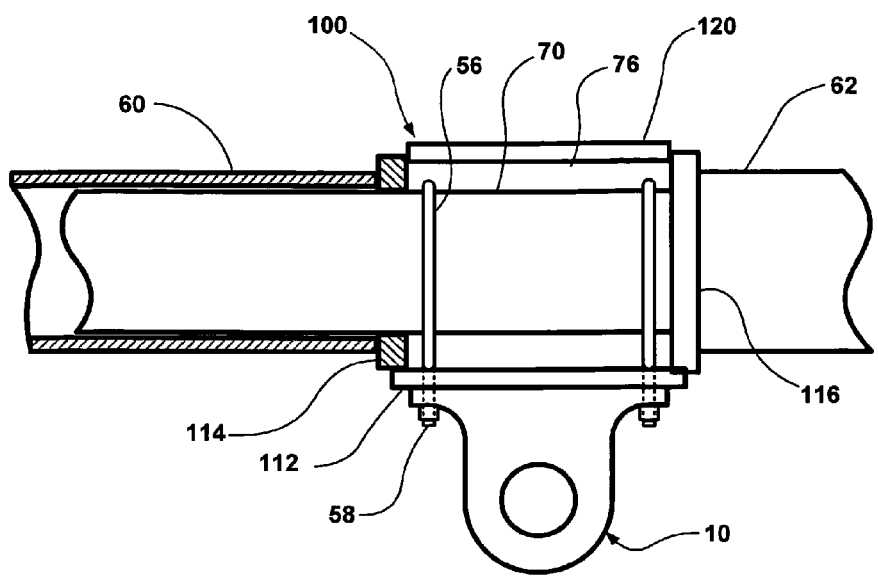
FIG. 5 is a bottom sectioned view of the tow assembly of FIG. 4 showing details of an interface and tow eye; and, FIG. 6 is a top view of an alternative embodiment of the invention of FIG. 4 having two tow eyes.

Turning now also to FIG. 5, a bottom view of the embodiment of FIG. 4 is shown, sectioned to remove the mounting brackets 80, 86. A feature of the embodiment of FIGS. 4 and 5 is an interface 100 for interconnecting the tow eye 10 to the inner member 70 and the outer member parts 60, 62. The interface 100 is formed as a box-like structure 100 having in the illustrated view a front face 112, a left side face 114, a right side face 116, a top face 118, and a rear face 120. The faces of the interface 100 may be formed of steel plate and welded or otherwise bonded together to make the box shape. The interface 100 encloses an interior space that may be seen in FIG. 5. The interface 100 does not include a bottom plate or face to allow access to the interior space and to prevent water from accumulating in the space.

As will be understood as the interface 100 is described, shapes other than a box shaped may be used as an interface for the tow eye, the outer member and inner member. For example, a cylindrical can structure or a hollow spherical structure could be used. In addition, it may be possible to provide a sleeve or band-like structure, including only a front face, side faces and rear face (and eliminating the top face), or a substitute therefor, if such is capable of transmitting forces applied to the tow eye 10 to the inner member 70 and outer member components 60, 62.

The first outer member part 60 extends laterally from the left side face 114 of the interface 100 and the second outer member part 62 extends laterally in the opposite direction from the right side face 116. The first outer member part 60 and second outer member part 62 are rigidly attached to the respective side faces, and may be mounted flush or in a counterbore provided on the respective side faces 114, 116.

Inner member 70 is disposed inside of and extends through first outer member part 60, interface 100, and second outer member part 62. The inner member 70 passes through holes in the side faces 114, 116, and is attached to the side faces. Similar to the embodiment of FIG. 2, the inner member 70 and the outer member parts 60, 62 are configured to allow relative movement in the portions away from the interface 100, and there may be provided a gap between the inner and outer members.

With particular attention to FIG. 5, the tow eye 10 is mounted to the front face 112 of the interface 100, as mentioned, and is structurally interconnected to the inner member 70 and outer member components 60, 62 by the interface 100. In the illustrated embodiment, U-bolts 56 extend around and engage the inner member 70, with free ends of the U-bolts extending through appropriately located apertures in the front face 112 and aligned apertures in the base 12 of the tow eye 10. The free ends of the U-bolts 56 are fastened to the front face 112 by nuts 58.

In this way, a load placed on the tow eye 10 is distributed to the first outer member part 60 and the second outer member part 62 by transmission through the side faces 114, 116 and is simultaneously distributed to the inner member 70 by way of the bolt fasteners 56 and the side faces 114, 116. Because the outer member components 60, 62 are not interconnected to the inner member 70 except at the interface 100, the outer member and inner member can transmit load independently to the brackets 80, 86. The tow assembly of the invention thus provides for greater load capacity than a single bar structure in approximately the same space.

In addition, and as in the other embodiments, the inner member and outer member provide redundant load bearing structures in the event that either, or a part of either, fails allowing for the load to be removed before a further failure.

The U-bolts 56 may be readily assembled by inserting each individually into a space 76 between the inner member 70 and the rear face 120 of the interface 100, and then pivoting the U-bolt so that the free ends extend through the mounting holes in the front face 112 and tow eye 10 and the curved portion engages the inner member.

Other fastening structures for interconnecting the tow eye 10, the interface 100, and inner member 70 may be used, as will be known to those skilled in the art.

Figure 6:
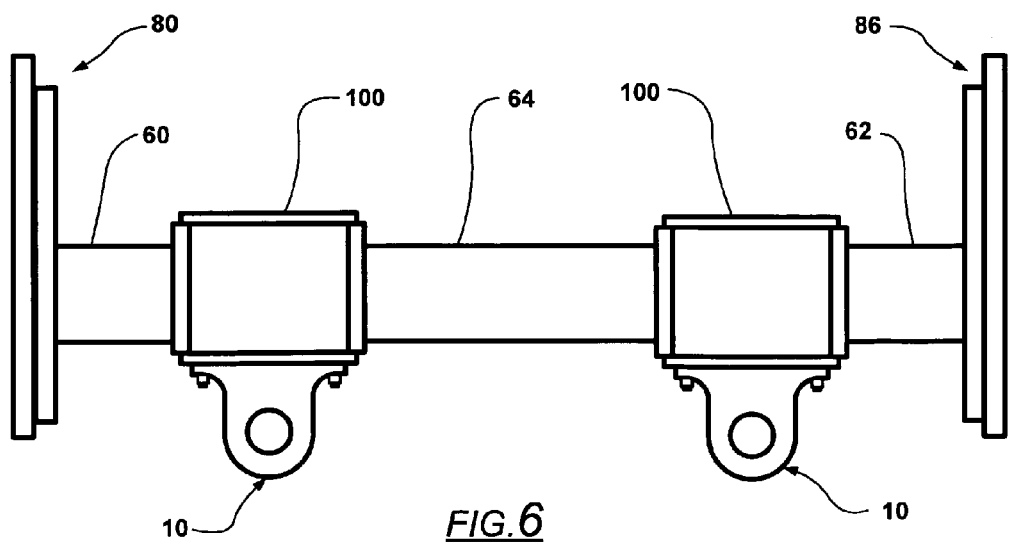

The invention may be adapted for a dual tow point structure by providing two tow eyes 10, as shown in FIG. 6. In a dual tow point embodiment modified from that shown in FIGS. 4 and 5, the outer member includes a center outer member 64 that connects and spaces the interfaces 100. The first outer member 60 and second outer member 62 each are mounted to a laterally facing side face of one of the interfaces 100, and are connected to a mounting bracket 80, 86. The inner member (not illustrated), similar to as described above, extends through the outer members and interfaces. The tow eyes 10 are mounted to the interfaces 100.

The invention has been described in terms of preferred principles, embodiments, and components; however, those skilled in the art will understand that equivalents may be substituted for what is described here without departing from the scope of the invention as defined in the appended claims.

What is claimed is:

1. A tow assembly for a truck, comprising:
   an outer member defining an enclosed interior space and having first and second ends;
   an inner member having first and second ends, the inner member disposed in the interior space of the outer member with the first and second ends of the inner member extending to the respective first and second ends of the outer member,
   a first mounting bracket connected to the first end of the outer member and the first end of the inner member; and,
   a second mounting bracket connected to the second end of the outer member and the second end of the inner member,
   a tow eye; and,
   an interface structurally interconnecting the tow eye, the outer member and the inner member, wherein a load placed on the tow eye is transmitted to both the outer member and the inner member.

2. The tow assembly of claim 1, wherein the interface includes at least one fastener extending through holes in the outer member, the inner member, and the tow eye.

3. The tow assembly of claim 1, wherein the outer member is a tubular member and the inner member is a tubular member having an outer diameter less than an inner diameter of the outer member.

4. The tow assembly of claim 3, wherein the interface comprises a sleeve disposed between and contacting both the outer member and the inner member and at least one fastener extending through holes in the outer member, sleeve, inner member, and tow eye, and wherein the tow eye is mounted on an outer surface of the outer member.

5. The tow assembly of claim 1, wherein the outer member is a rectangular tubular member and the inner member is an I-beam, and wherein the tow eye is mounted on a face of the outer member and wherein the interface fastens the tow eye to the face of the outer member and at least one flange of the I-beam.

6. The tow assembly of claim 1, wherein the interface comprises a front face, a rear face, and oppositely located side faces defining an interior space, wherein the outer member comprises a first tubular member attached to and extending from one side face of the interface and a second tubular member attached to and extending from an opposite side face of the interface, and wherein the inner member is disposed in and extends through the first tubular member, the interior space of the mounting interface, and the second tubular member, and wherein the inner member is attached to the side faces of the interface.

7. The tow assembly of claim 6, wherein the tow eye is mounted on the front face of the interface and wherein the interface further comprises fasteners engaging the inner member and having free ends extending through holes in the front face of the mounting interface and holes in the tow eye.

8. The tow assembly of claim 1, wherein:
the interface comprises a member having a cylindrical outer surface and oppositely located end faces and defining an enclosed interior space,
the outer member comprises a first tube attached to and extending from one end face of the interface and a second tube attached to and extending from an opposite end face of the interface,
the inner member is disposed in and extends through the first tube, the interior space of the interface, and the second tube,
the inner member is attached to the end faces of the interface.

9. The tow assembly of claim 8, wherein the tow eye is mounted on the outer cylindrical surface of the tubular member and the interface further comprises bolts engaging the inner member and having free ends extending through holes in the front face of the hollow member and holes in the tow eye.

10. The tow assembly of claim 1, wherein the inner member is a tubular member.

11. The tow assembly of claim 1, wherein the tow eye comprises a base, upper and lower flanges extending from the base in mutually perpendicular, spaced arrangement, and wherein the upper and lower flanges each have a hole, the holes aligned to accept a tow pin.

12. The tow assembly of claim 1, wherein the tow eye is disposed at about a center of the assembly.

13. The tow assembly of claim 1, further comprising a second tow eye structurally interconnected to the outer member and the inner member, wherein a load placed on the second tow eye is transmitted to both the outer member and the inner member, wherein the tow eye and second tow eye are mutually spaced from a center of the tow assembly.

* * * * *